United States Patent
Nicolas et al.

(10) Patent No.: US 9,168,789 B2
(45) Date of Patent: Oct. 27, 2015

(54) TRUCK TIRE

(75) Inventors: Bernard Robert Nicolas, Arlon (BE);
Francois Pierre Charles Gerard Georges, Stavelot (BE); Vincent Benoit Mathonet, Habay la Neuve (BE); Roland Willibrord Krier, Biwer (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 543 days.

(21) Appl. No.: 12/339,567

(22) Filed: Dec. 19, 2008

(65) Prior Publication Data
US 2010/0154958 A1 Jun. 24, 2010

(51) Int. Cl.
B60C 9/18 (2006.01)
B60C 9/28 (2006.01)
B60C 9/20 (2006.01)
B60C 9/00 (2006.01)

(52) U.S. Cl.
CPC . *B60C 9/28* (2013.01); *B60C 9/005* (2013.04); *B60C 9/2006* (2013.04); *B60C 2200/06* (2013.04); *Y10T 152/10792* (2015.01)

(58) Field of Classification Search
CPC ........ B60C 9/28; B60C 9/2006; B60C 9/005; B60C 2200/06
USPC .................. 152/526, 531, 535, 538
See application file for complete search history.

(56) References Cited

U.S. PATENT DOCUMENTS

| | | | |
|---|---|---|---|
| 3,557,858 A * | 1/1971 | Lugli et al. ............... | 152/187 |
| 3,667,527 A * | 6/1972 | Magistrini et al. .......... | 152/176 |
| 3,703,202 A * | 11/1972 | Maiocchi ................ | 152/175 |
| 4,688,615 A * | 8/1987 | Lee ..................... | 152/531 |
| 4,947,915 A | 8/1990 | Panikkar et al. ........... | 152/531 |
| 5,176,769 A | 1/1993 | Kadota et al. ............ | 152/523 |
| 5,225,013 A | 7/1993 | Ohsawa et al. ........... | 152/527 |
| 5,385,193 A * | 1/1995 | Suzuki et al. ............. | 152/525 |
| 5,465,773 A | 11/1995 | Kadota et al. ............ | 152/454 |
| 5,535,801 A | 7/1996 | Iseki et al. .............. | 152/528 |
| 5,591,284 A * | 1/1997 | Gaudin ................. | 152/532 |
| 5,685,928 A | 11/1997 | Toyoda ................. | 152/533 |
| 5,738,740 A * | 4/1998 | Cluzel .................. | 152/527 |
| 5,843,583 A * | 12/1998 | D'Haene et al. .......... | 428/592 |
| 6,058,997 A | 5/2000 | Nishida et al. ........... | 152/529 |
| 6,065,518 A * | 5/2000 | Miyawaki et al. ......... | 152/454 |
| 6,116,311 A | 9/2000 | Ueyoko et al. ........... | 152/531 |

(Continued)

FOREIGN PATENT DOCUMENTS

| | | | | |
|---|---|---|---|---|
| DE | 2602424 | 1/1976 | ............... | B60C 9/18 |
| EP | 0540303 | 5/1993 | ............... | B60C 9/00 |

(Continued)

OTHER PUBLICATIONS

U.S. Appl. No. 12/339,527, filed Dec. 19, 2008, Krier, et al.

(Continued)

*Primary Examiner* — Ryan Ochylski
(74) *Attorney, Agent, or Firm* — June E. Rickey

(57) ABSTRACT

A pneumatic tire for use on trucks, the tire comprising: a tread which includes a belt reinforcement structure, the belt structure including a pair of working belts, wherein the angle of the working belts range from about 16 degrees to about 30 degrees, wherein a low angle belt is positioned preferably between of the working belts, wherein the angle of the low angle belt is less than 5 degrees. The working belts are extensible, and preferably made of high elongation wire.

10 Claims, 3 Drawing Sheets

(56) References Cited

U.S. PATENT DOCUMENTS

| | | | |
|---|---|---|---|
| 6,125,900 | A | 10/2000 | De Loze de Plaisance et al. ............... 152/531 |
| 6,352,093 | B1 | 3/2002 | Losey ..................... 152/528 |
| 6,367,527 | B1* | 4/2002 | Cluzel ..................... 152/527 |
| 6,554,035 | B1* | 4/2003 | Miyawaki et al. ......... 152/451 |
| 7,216,684 | B2 | 5/2007 | Villanueva et al. ........ 152/531 |
| 7,404,425 | B2 | 7/2008 | Hardy et al. |
| 2003/0201047 | A1* | 10/2003 | Rayman et al. ........... 152/209.1 |
| 2005/0194081 | A1 | 9/2005 | Yano et al. ............... 152/527 |
| 2006/0027300 | A1* | 2/2006 | Maruoka .................. 152/534 |
| 2006/0169383 | A1* | 8/2006 | Radulescu et al. ........ 152/538 |
| 2006/0237114 | A1 | 10/2006 | Takanami ................. 152/533 |
| 2007/0130905 | A1* | 6/2007 | Kish ....................... 57/237 |
| 2007/0137748 | A1 | 6/2007 | Itai ......................... 152/209 |
| 2007/0221307 | A1 | 9/2007 | Yano et al. ............... 152/527 |
| 2007/0221308 | A1 | 9/2007 | Yano et al. ............... 152/527 |
| 2008/0156410 | A1* | 7/2008 | Isobe ...................... 152/531 |
| 2013/0248073 | A1* | 9/2013 | Becker et al. ............. 152/527 |

FOREIGN PATENT DOCUMENTS

| | | | |
|---|---|---|---|
| EP | 661180 | 5/1995 | ............... B60C 9/22 |
| EP | 0501782 B1 | 1/1996 | |
| EP | 0875402 | 3/2001 | ............... B60C 9/18 |
| EP | 1518666 | 3/2005 | ............ B29D 30/70 |
| EP | 1707403 A1 * | 10/2006 | |
| EP | 2199105 A1 | 6/2010 | |
| GB | 1567614 A | 5/1980 | |
| WO | WO88-03481 | 5/1988 | ............... B60C 9/18 |
| WO | WO2005016666 A1 | 2/2005 | |
| WO | WO2005113258 A1 | 12/2005 | |

OTHER PUBLICATIONS

U.S. Appl. No. 12/339,546, filed Dec. 19, 2008, Krier, et al.
U.S. Appl. No. 12/339,585, filed Dec. 19, 2008, Georges, et al.
U.S. Appl. No. 12/339,605, filed Dec. 19, 2008, Georges, et al.
European Search Report completed Jan. 23, 2012.

* cited by examiner

TRUCK TIRE

FIELD OF THE INVENTION

The invention relates in general to pneumatic tires for vehicles such as trucks.

BACKGROUND OF THE INVENTION

The commercial truck market is moving towards an increase in overall vehicle weight, which is due in part to the increase in weight of the motor and equipment. The increase in overall vehicle weight requires a tire capable of handling the additional loading. Thus, a tire with improved crown durability and increased load carrying capacity is desired.

DEFINITIONS

"Aspect Ratio" means the ratio of a tire's section height to its section width.

"Axial" and "axially" mean the lines or directions that are parallel to the axis of rotation of the tire.

"Bead" or "Bead Core" mean generally that part of the tire comprising an annular tensile member, the radially inner beads are associated with holding the tire to the rim being wrapped by ply cords and shaped, with or without other reinforcement elements such as flippers, chippers, apexes or fillers, toe guards and chafers.

"Belt Structure" or "Reinforcing Belts" means at least two annular layers or plies of parallel cords, woven or unwoven, underlying the tread, unanchored to the bead, and having both left and right cord angles in the range from 17° to 27° with respect to the equatorial plane of the tire.

"Bias Ply Tire" means that the reinforcing cords in the carcass ply extend diagonally across the tire from bead-to-bead at about 25-65° angle with respect to the equatorial plane of the tire, the ply cords running at opposite angles in alternate layers "Block element" means a tread element defined by a circumferential groove or shoulder and a pair of laterally extending grooves.

"Breakers" or "Tire Breakers" means the same as belt or belt structure or reinforcement belts.

"Carcass" means a laminate of tire ply material and other tire components cut to length suitable for splicing, or already spliced, into a cylindrical or toroidal shape. Additional components may be added to the carcass prior to its being vulcanized to create the molded tire.

"Circumferential" means lines or directions perpendicular to the axial direction within + or −5 degrees.

"Cord" means one of the reinforcement strands, including fibers, which are used to reinforce the plies.

"Extensible" means a cable having a relative elongation at break of greater than 0.2% at 10% of the breaking load, when measured from a cord extracted from a cured tire.

"Inner Liner" means the layer or layers of elastomer or other material that form the inside surface of a tubeless tire and that contain the inflating fluid within the tire.

"Inserts" means the reinforcement typically used to reinforce the side edges of runflat-type tires; it also refers to the elastomeric insert that underlies the tread.

"Ply" means a cord-reinforced layer of elastomer-coated, radially deployed or otherwise parallel cords.

"Radial" and "radially" mean directions radially toward or away from the axis of rotation of the tire.

"Radial Ply Structure" means the one or more carcass plies or which at least one ply has reinforcing cords oriented at an angle of between 65° and 90° with respect to the equatorial plane of the tire.

"Rib" means a circumferentially extending strip of rubber of the tread which is defined by at least one circumferential groove and either a second circumferential groove or a lateral edge, wherein the strip is not divided by full depth grooves.

"Radial Ply Tire" means a belted or circumferentially-restricted pneumatic tire in which the ply cords which extend from bead to bead are laid at cord angles between 65° and 90° with respect to the equatorial plane of the tire.

"Side edge" means a portion of a tire between the tread and the bead.

"Sipe" means small slots or elongated void areas typically formed by thin steel blades, and which tend to remain closed, and function to increase traction.

"Laminate structure" means an unvulcanized structure made of one or more layers of tire or elastomer components such as the innerliner, side edges, and optional ply layer.

BRIEF DESCRIPTION OF THE DRAWINGS

The invention will be described by way of example and with reference to the accompanying drawings in which.

DETAILED DESCRIPTION OF THE INVENTION

Figure 1:
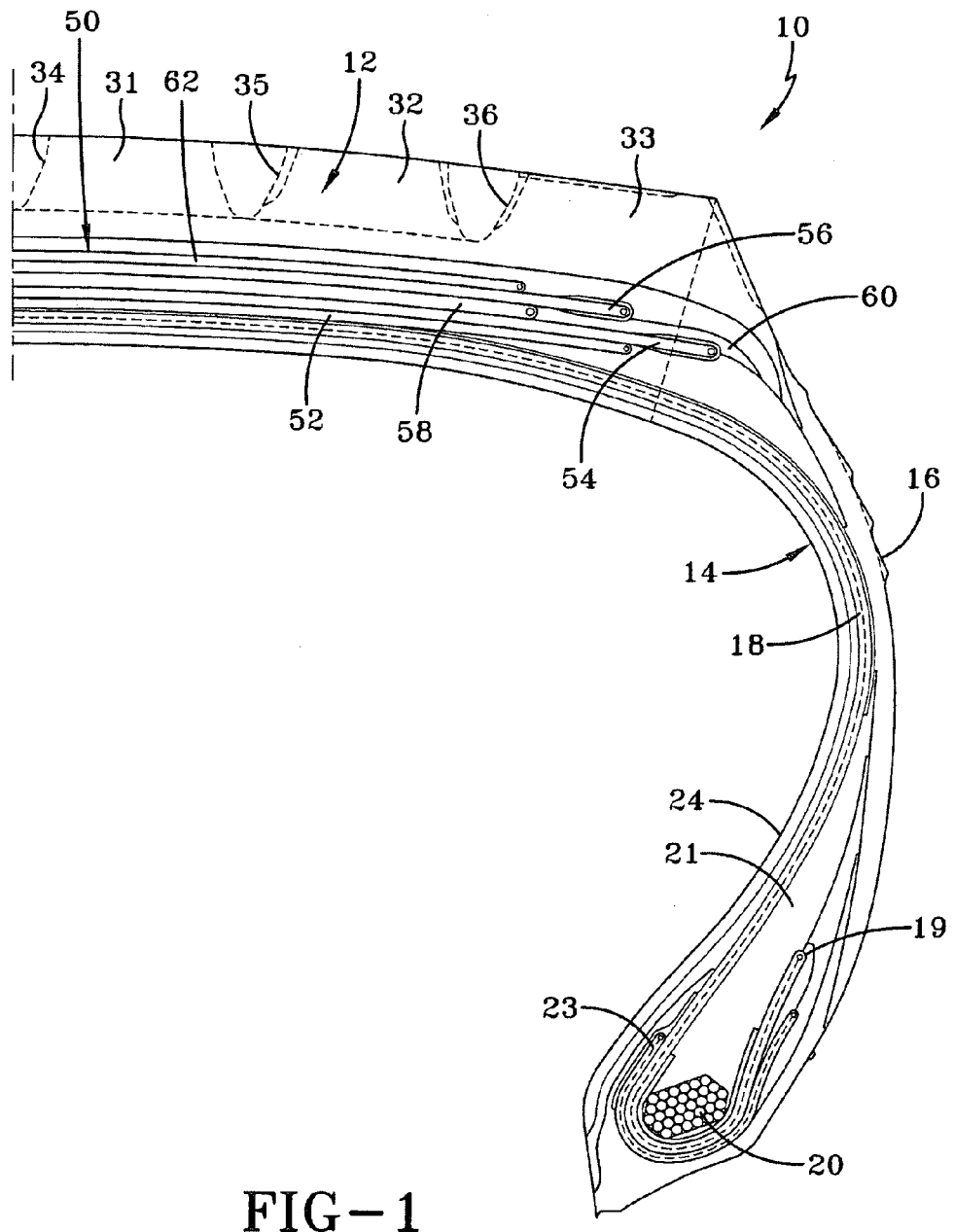
FIG. 1 is a cross-sectional view of a first embodiment of a tire of the present invention.
Figure 2:
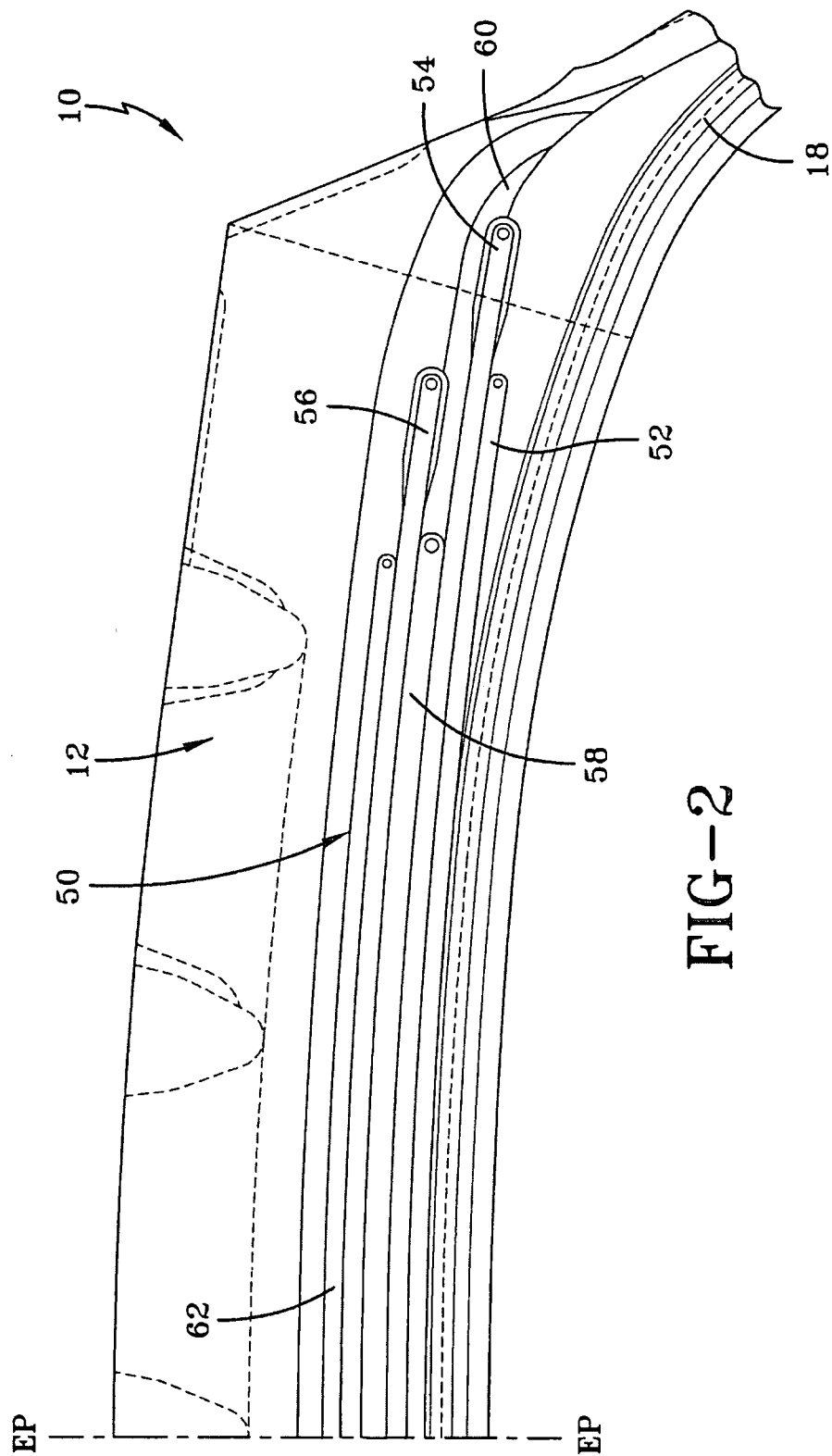
FIG. 2 is a close-up view of the belt package of the tire of FIG. 1.

FIG. 1 illustrates a first embodiment of a pneumatic tire, suitable for use as a truck tire. The tire 10 has a tread 12 with a non-skid depth D. The tire tread 12 may comprise a plurality of circumferentially continuous ribs, which may vary, but are shown for example as ribs 31, 32 and 33. Positioned between each rib is a circumferential groove 34, 35, 36, which are preferably continuous. The tread may also comprise optional sipes (not shown). The tread pattern is not limited to same, and may comprise, for example, a plurality of blocks and grooves (not shown).

The tire 10 further comprises a casing 14 which includes two opposed sidewalls 16 which extend down from the tread 12 to the bead area. The casing of the tire may optionally include an inner liner 24 which is typically formed of halobutyl rubber which forms an air impervious barrier. The tire casing 14 further includes one or more radial plies 18 extending from the tread, down the sidewall to the tire bead 20. Preferably the radial ply 18 is wrapped about or otherwise secured to each annular bead 20. In the embodiment illustrated and not limited to same, there is only one ply 18 and it is wrapped around the bead in an inside out manner such that the ply ending 19 is located axially outward and radially outwards of the bead. The beads 20 may be any desired shape, but in this embodiment it is shown as a hexagonal configuration with steel filaments.

The tire may further optionally include an apex 21 which may be shaped like a triangle. The ply turnup in the bead area may be optionally reinforced with a chipper 23 wrapped about the bead ply 18.

The tire 10 further includes a belt package 50 which is located between the tread and the one or more plies 18. The belt package may be comprised of one or more layers of reinforcement. The ply 18 and the belt reinforcing structure 50 are made from cord reinforced elastomeric material, wherein the cords are typically steel wire or polyamide filaments and the elastomer preferably being rubber.

The belt reinforcing package 50 may include an optional radially inner transition belt 52. The transition belt 52 may be the narrowest belt of the structure 50. The transition belt 52 has a belt width which ranges from about 0.6 to about 0.9 of the tread arc width. The transition belt 52 preferably has an orientation that has an angle of between about 45 to about 70 degrees (right). The transition belt 52 is preferably made of ultra tensile steel with a construction of 3+2x0.35.

Belt reinforcing structure 50 further includes a pair of extensible working belts, 54, 56. Belt 54 is located radially inwards of belt 56. Belt 54 has a width which is about equal to the tread arc width. Preferably, belt 54 has a belt width substantially equal to the tread arc width. The breaker angle of belt 54 is between about 16 and 30 degrees, preferably with a right orientation, more preferably in the range of about 19 to about 25 degrees. Belt 54 is preferably made of high elongation wire, which is has a % elongation at 10% of breaking load of greater than 0.4%, as measured from a cord taken from a cured tire. Alternatively, the cable has a % elongation at 10% of breaking load of greater than 1.7% when measurement is performed on a bare wire sample that has not been vulcanized in a tire. For example, the belt may be formed of wire having a wire construction of 3x7x, 3x4x, 4x4x. Preferably the wire has a construction of 3x7x0.22 HE. The EPI may range from about 8 to about 14.

Belt 56 is the second member of the working belt pair. Belt 56 has a width less than the width of belt 54 (the other working belt), and is preferably radially outward of belt 54. Preferably, the belt 56 has a width less than the width of belt 54 by a step off, which may range from about 10 to about 20 mm. Belt 56 has a breaker angle between about 16 and 30 degrees, preferably with a left orientation, more preferably in the range of about 19 to about 25 degrees. Belt 56 is preferably made of high elongation wire, having the same construction with the same but opposite angular orientation as belt 54.

The belt structure 50 further comprises a fourth belt 58 which is preferably located between the working pair belts, 54, 56. The fourth belt 58 may also be located between belts 52 and 54 or radially outward of belt 56. The fourth belt 58 has reinforcements that are oriented circumferentially at 5 degrees or less, preferably 0 degrees. The belt is preferably formed from spirally winding a rubberized strip of one or more cords. Preferably the strip has about 4 steel cords. Alternatively the belt may be formed of a cut belt with the reinforcements oriented in the range of 0 to about 10 degrees from the circumferential direction. The belt 58 has a width sized to avoid compression in the shoulder area. The belt width of fourth belt 58 is preferably in the range of about 70% to about 80% of the tread arc width, and even more preferably in the range of 73-77%. The fourth belt 58, is wide enough to decrease the strain cycles in the breaker wedge, and is just stopped before the shoulder area to avoid 0 degree wire compression and a too round footprint. The belt structure of fourth belt 58 may be steel formed of 4+3x0.35 construction, and formed of high tensile steel, which means having a % elongation at 10% of breaking load of 0.18 or more, for measurements taken from a cured tire. For measurements taken from bare cords, the % elongation at 10% of breaking load is 0.2 or more. Alternatively, the fourth belt may be formed of non-metal reinforcements such as aramid, carbon fiber, or polyketone or POK.

The belt structure may further include an optional overlay belt. The overlay belt 62 may be the narrowest belt and is located radially outward of the other belts. Preferably, the belt should have the same angle and orientation as the adjacent belt, 56.

Figure 3:
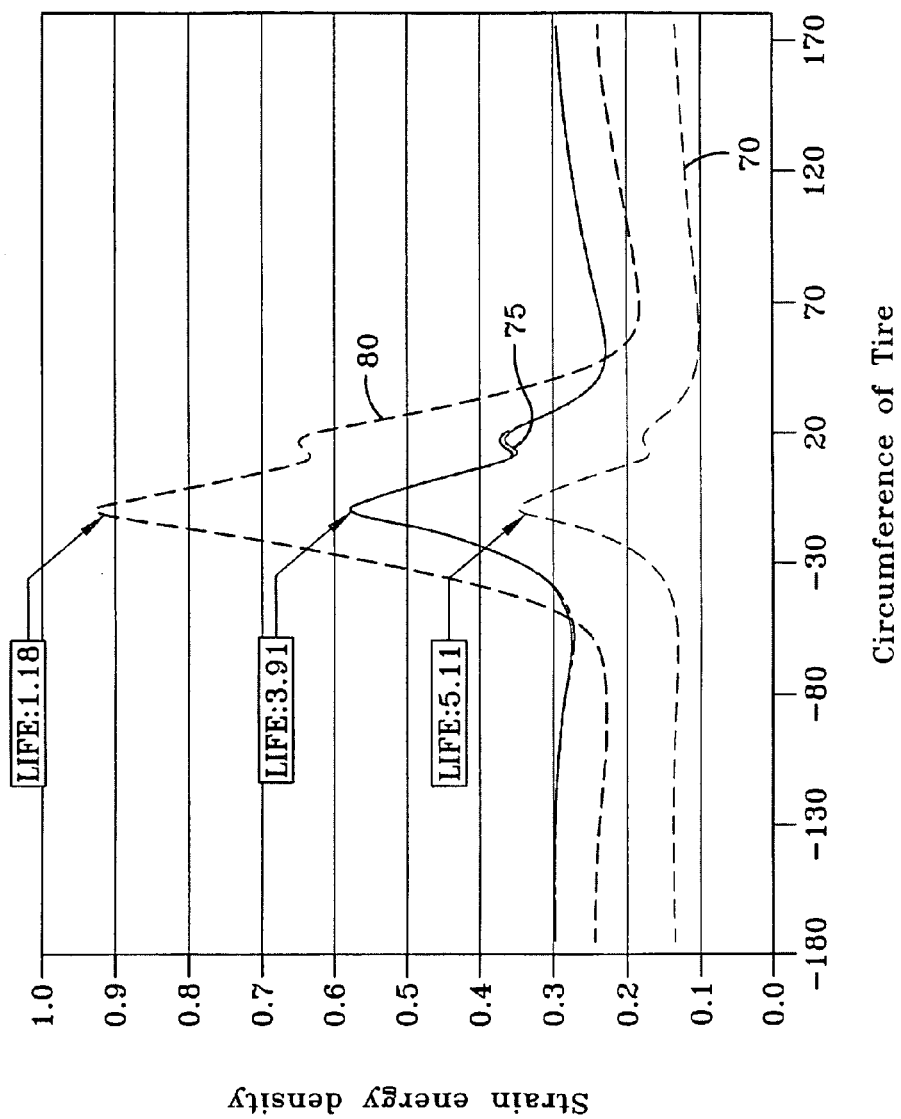
FIG. 3 is a plot of strain energy density vs. a tire revolution.

FIG. 3 illustrates a finite element analysis of a belt package of the present invention. Curve 80 represents the strain energy density of a control tire versus circumferential location in the tire. The control tire had the belt construction of 55R-16R-16L-16L with high tensile steel belts. FEA analysis indicated the control tire had a life of 1.18. Curve 75 represents the strain energy density of a tire of a first example having a belt package with a zero degree belt and the working belts made of inextensible reinforcements. The belt package of the first example is 55R-21R-0-21L-21L, wherein the belts were made of high tensile steel. The predicted life of the tire was 3.91. Curve 70 represents the strain energy density of a tire of a second example having a belt package with a zero degree belt and working belts the same as curve 75, but all of the belts were made of high elongation cable. The tire of this example had the longest life of 5.11, showing a noticeable benefit of using high elongation cable.

The aspect ratio of the tire described above may vary. The aspect ratio is preferably in the range of about 50 to about 90. The tire may have a net to gross ratio in the range of about 70 to about 90, more preferably in the range of about 74 to about 86, more preferably about 78 to 84.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A pneumatic tire for use on trucks, the tire comprising: a tread and a belt reinforcement structure located radially inward of the tread, wherein the tread is permanently affixed to a carcass of the tire, the belt structure including a pair of working belts, wherein the angle of the working belts range from about 16 degrees to about 30 degrees from the circumferential direction, wherein the working belts are formed of high elongation wire and are extensible, wherein the belt structure further comprises a low angle belt having reinforcements angled at less than 5 degrees wherein the low angle belt is located between the working belts, wherein the working belts have a higher % elongation at 10% of breaking load than the low angle belt.

2. The tire of claim 1 wherein the radially inner working belt has a width about equal to the tread arc width.

3. The tire of claim 1 wherein the radially outer working belt has a width less than the radially inner working belt.

4. The tire of claim 1 wherein the radially inner working belt is the widest belt of the belt reinforcement structure.

5. The tire of claim 1 wherein the low angle belt has a width in the range of about 70 to about 80 percent of the tread arc width.

6. The tire of claim 1 further including a transition belt located radially inwards of the working belts.

7. The tire of claim 5 wherein the transition belt has an angle which ranges from about 45 to about 70 degrees right.

8. The tire of claim 5 wherein the transition belt has a width of about 60 to about 80 percent of the tread arc width.

9. The tire of claim 1 wherein the aspect ratio of the tire is less than or equal to about 0.6.

10. The tire of claim 1 wherein the low angle belt is continuously wound from shoulder to shoulder.

\* \* \* \* \*